United States Patent [19]

Sullivan et al.

[11] Patent Number: 5,243,761
[45] Date of Patent: Sep. 14, 1993

[54] PORTABLE RESCUE TOOL

[75] Inventors: Kevin Sullivan, Gastonia, N.C.; Arnold E. Redsicker, Guilford; Thomas W. Hotchkiss, Orange, both of Conn.

[73] Assignee: Hale Fire Pump Company, Conshohocken, Pa.

[21] Appl. No.: 853,637

[22] Filed: Mar. 18, 1992

[51] Int. Cl.$^5$ .................................................. B25F 3/00
[52] U.S. Cl. .................................. 30/134; 60/407; 173/169
[58] Field of Search ............... 30/134, 210, 216, 228; 60/407; 173/169, 170

[56] References Cited

U.S. PATENT DOCUMENTS

| | | | |
|---|---|---|---|
| 2,306,200 | 12/1942 | Whitcomb | 60/407 |
| 4,201,051 | 5/1980 | Hall | 60/407 |
| 4,392,263 | 7/1983 | Amoroso | 30/134 |
| 4,531,289 | 7/1985 | Brick | 30/134 |
| 4,549,349 | 10/1985 | Harrison | 30/134 |

Primary Examiner—Frank T. Yost
Assistant Examiner—Hwei-Siu Payer
Attorney, Agent, or Firm—Frank A. Follmer

[57] ABSTRACT

A rescue tool as incorporated into a portable unit both the tool operating mechanism and the hydraulic power means necessary to provide a self-contained tool. An elongated tool body comprises the rescue tool mechanism and its associated hydraulic actuator unit, an air-/oil intensifier pump for driving the hydraulic actuator unit, the control valves for the pump, and an air valve for actuating the hydraulic control valves to their control positions, whereby the only hose connection to the portable unit is a single air hose for supplying high pressure air.

11 Claims, 5 Drawing Sheets

PORTABLE RESCUE TOOL

BACKGROUND AND SUMMARY OF THE INVENTION

This invention relates generally to portable rescue tools of the type used at an emergency scene such as an accident or a fire. More particularly, the invention relates to a portable rescue tool that is fluid powered and capable of applying a high magnitude force to perform a rescue operation.

Typical of the portable rescue tools to which the invention relates are the rescue tools manufactured by Hurst Emergency Products division of Hale Products, Inc. including, for example, cutting tools, spreading tools, rams, and the like. Presently, the rescue tools of the indicated type are provided as part of a system which includes a power unit for providing hydraulic power for operating the tools, there being provided gasoline, diesel, electric, and pneumatic power units. These power units are incorporated as a separate portable unit and include a positive displacement hydraulic pump. The portable rescue tool is also made as a separate unit and is connected to the hydraulic pump of the power unit by means of two hydraulic lines, namely, a supply line and a return line. The rescue tools are commonly provided with a manually operable control valve for controlling the flow of the hydraulic fluid from the pump in a manner to control operation of the rescue tool mechanism.

While the above-described rescue systems including a separate portable power unit and portable rescue tool are very satisfactory in most applications, they do limit the freedom of movement of the tool operator by reason of the use of the two hydraulic hose lines which extend between the power unit and the portable rescue tool carried by the tool operator as he performs the rescue operation.

It is the general object of the present invention to provide a rescue tool of the indicated type which is self-contained in that both the tool operating mechanism and the hydraulic power means for operating the same are incorporated into a single portable structure. Thus, in a preferred embodiment of the invention, an elongated tool body includes a rescue tool mechanism and its associated hydraulic actuator unit, an air/oil intensifier pump for driving the hydraulic actuator unit, control valve means for the pump, and an air valve for actuating the hydraulic control valves to their control positions. By reason of the novel construction in accordance with the invention, the only hose connection to the portable rescue tool is a single air hose for supplying high pressure air from a supply thereof. In order to make the rescue tool completely portable in that the tool can be carried by a single person with complete freedom of movement, the high pressure air supply is provided in a portable container for high pressure air and there is provided a single hose line extending from the container to the air supply inlet on the rescue tool.

Other features of the invention include the following:

(1) There is provided a convenient three position air operated "rocker switch" type of valve for controlling operation of the tool.

(2) The tool is constructed to be light in weight and easily carried by a single person.

(3) The tool is designed to operate off of any compressed air source, such as SCBA bottles, air compressors, cascade systems, or the like.

(4) The tool can be adapted to operate off of any compressed inert gas, such as nitrogen, in addition to operation by compressed air as in the case of the preferred embodiment.

(5) The hydraulic system is self-contained to thereby minimize user exposure to hydraulic fluid.

(6) The entire rescue system is self-contained thereby allowing use by any rescue personnel with access to a compressed air source, or the like.

(7) The self-contained system allows for access to remote rescue scenes and to rescue operations in confined spaces.

(8) The operation of the rescue system by air power allows for use in explosive gas environments.

DETAILED DESCRIPTION OF THE PREFERRED EMBODIMENT

The rescue tool shown in the drawings comprises a cutting tool of the type manufactured by Hurst Emergency Products Division of the Hale Products, Inc. and designated the "Mighty-Bite" (Model ML-50). This cutter is specifically 10 designed for applications requiring superior power in a compact cutter.

Figure 2:
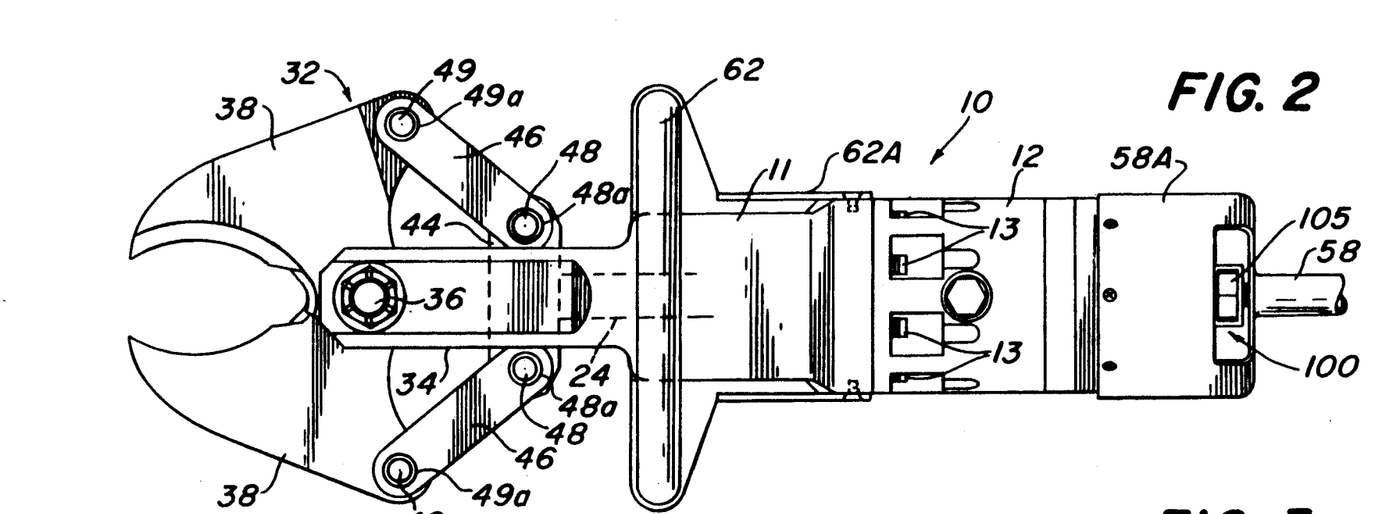
FIG. 2 is a top plan view of the portable rescue tool shown in FIG. 1.
Figure 3:
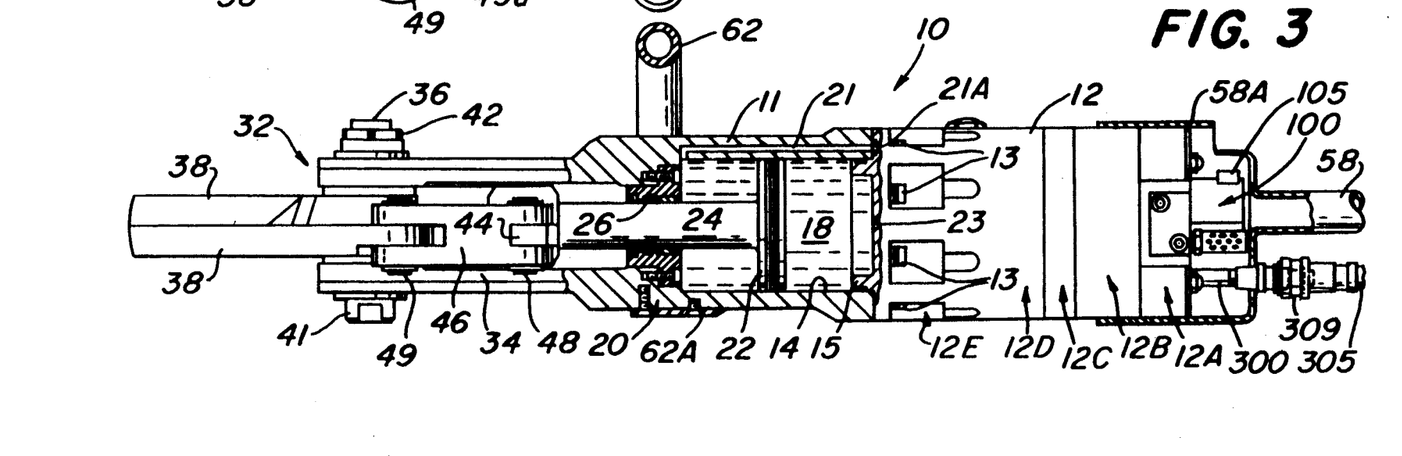
FIG. 3 is a side elevational view of FIG. 2 with a portion thereof shown in section for illustrative purposes.

The tool comprises an elongated, generally cylindrical body 10 including a forward body portion 11 and a rear body portion 12. Forward and rear body portions 11 and 12 have a cylindrical configuration and are secured together in coaxial longitudinal alignment at annular mating surfaces by a plurality of mounting bolts 13 which are spaced circumferentially equally around the tool body 10 as is shown in FIGS. 2 and 3. As is shown in FIG. 3, rear body portion 12 has an annular forward extension 15 that extends within the rearward end of an axial cylindrical bore 14 in the end of forward body portion 11. The annular extension 15 is provided with an O-ring seal extending around the peripheral wall thereof to cooperate with the opposed wall of cylindrical bore 14 to provide a seal therebetween.

Cylindrical bore 14 is concentric with the longitudinal axis of body portion 11 to form a generally hollow portion and to provide an elongated, cylindrical fluid chamber or cylinder 18, enclosed at its forward end by an annular, integrally formed forward end portion 20 of body portion 11 as shown in FIG. 3. A fluid-actuated piston 22, also shown in FIG. 3, is slidably disposed within cylinder 18 for controlled movement along the longitudinal axis of the tool toward and away from opposite ends of the cylinder 18. Piston 22 is secured to the rearward end of a piston rod 24 by conventional means, such as a screw-threaded engagement. The forward end of the piston rod 24 extends out of the forward end of cylinder 18 through a circular opening in the forward end portion 20. A high pressure sealing and packing ring 26 is seated in the annular forward end portion 20 to prevent fluid leakage around the piston rod 24 at the forward end of the cylinder 18. Within the packing ring 26 is a piston rod sleeve bearing that supports and guides piston rod 24 in its axial movement. The rearward end of the cylinder 18 is closed by the forward end wall of rear body portion 12 and the forward extension 15 thereof, which, in effect, provide a cylinder head.

The above-described means including the piston 22 reciprocable within cylinder 18, and the parts associated therewith, comprise a hydraulic actuator unit. The hydraulic actuator unit also includes a conduit means for delivering high pressure fluid to cylinder 18 for causing operation of the unit, such conduit means having a first flow line arranged to communicate with cylinder 18 on one side of piston 22 and a second flow line arranged to communicate with cylinder 18 on the other side of piston 22. To this end, body portion 11 is provided with a longitudinal passage 21 which extends between the rear end of body portion 11 to a location communicating with the forward end of cylinder 18, as shown in FIG. 3. Passage 21 communicates with a passage 21A in the forward end wall of body portion 12, as shown in FIG. 3. Thus, passages 21 and 21A form part of a first flow line arranged to communicate with the cylinder 18 on the forward side of piston 22. Rear body portion 12 is also provided with a flow passage 23 which has one end terminating in the forward end wall of body portion 12 to thereby communicate with the cylinder 18 on the rearward side of piston 22 as is apparent from a consideration of FIG. 3. Passage 23 forms a part of the second flow line arranged to communicate with the cylinder 18. The first and second flow lines described above provide conduit means through which pressurized fluid is supplied to either the forward or rearward sides of the piston 22 by reason of their communication with the forward and rearward ends of the cylinder 18 to thereby power the piston 22 and the piston rod 24 to extend or retract along the longitudinal axis of the tool relative to the tool body 10.

A rescue tool mechanism, namely, a cutter 32, is mounted on the front end of tool body portion 11, said cutter being similar to that incorporated in the "Mighty-Bite" cutting tool and disclosed in detail in U.S. Pat. No. 4,506,445. Briefly, cutter 32 includes a pair of parallel, spaced-apart, longitudinally extending support brackets 34 which are integral with the body portion 11.

Brackets 34 are spaced equal distances above and below the longitudinal axis of the tool and of the cylinder 18 within body portion 11. Brackets 34 are aligned to carry a fixed pivot axle 36 for supporting a pair of high-strength steel cutting blades 38 having opposite sides and being movable between a non-cutting open position and a closed cutting position, shown in solid and dashed lines, respectively, in FIG. 4. Axle 36 is disposed normal to the longitudinal axis of tool body 10 and has a head 41 at one end and is secured at the other end by a nut 42 and associated washers.

Figure 4:
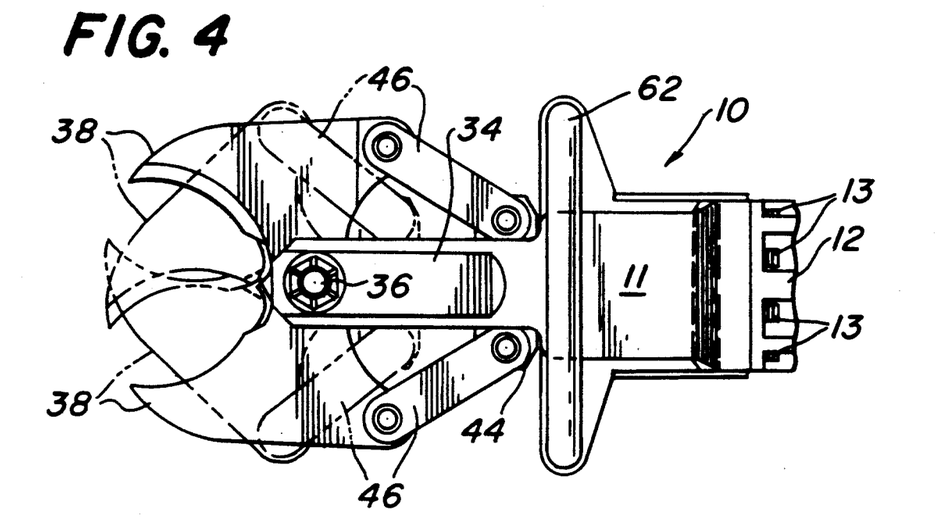
FIG. 4 is a detailed view showing the operation of the rescue tool mechanism, i.e., the cutter blades, mounted at one end of the tool body.

At the forward end of the piston rod 24, there is provided a pivot bar 44 disposed between the brackets 34. Pivot bar 44 is secured to the forward end of the piston rod 24 by means of a screw-threaded arrangement, as described in said patent. Pivot bar 44 is pivotally interconnected to the cutting blades 38 by links 46 which are disposed on opposite sides of the longitudinal axis and are pivotally interconnected to the pivot bar 44 and cutting blades 38 by means of pins and fasteners 48, 48a, and 49 and 49a, respectively.

Cutting blades 38 are movable between the non-cutting open and closed cutting positions thereof in response to the application of pressurized fluid to opposite sides of the piston 22. The operation of the cutter 32 to effectuate the operation of the cutting blades 38 is under the control of a trigger switch and control means to be described more fully hereafter. The movement of the piston 22 toward the forward end wall 20 drives the piston rod 24 and pivot bar 44 toward the axle 36 thereby driving links 46 into cutting blades 38. The driving of the links 46 pivots cutting blades 38 around axle 36 thereby moving them into their closed cutting position and cutting the material or member that is desired to be cut. When the piston 22 is driven toward the forward end of the cylinder 18 (by the pumping of pressurized hydraulic fluid through passageway 23 into cylinder 18), the low pressure hydraulic fluid between the piston 22 and the forward end wall 20 is removed from cylinder 18 through passageways 21 and 21A and returned to the pump via a return line for recycling and repressurization as will be described in detail hereafter.

When it is desired to open the cutting blades 38 after cutting has been completed, the control switch is moved in the appropriate direction resulting in the pumping of pressurized hydraulic fluid through passageways 21 and 21A into the cylinder 18 between the piston 22 and the forward end wall 20 thereby forcing the piston 22 along the longitudinal axis toward the rear end wall of cylinder 18 provided by extension 15 of body portion 12. The movement of the piston 22 toward the rear pulls the piston rod 24 and the pivot bar 44 rearwardly. This rearward movement of the pivot bar pulls the links 46 rearwardly thereby pivoting, separating and opening the cutting blades 38. When the pressurized fluid is introduced via the lines 21 and 21A, the low pressure hydraulic fluid between the piston 22 and the rear of cylinder 18 is forced into a passageway 23 and returned to the pump for recycling and repressurization as will be described more fully hereafter.

Power means are mounted in the rear body portion 12 of the tool body 10 for pumping hydraulic fluid at a high pressure through the conduit means of the hydraulic actuator unit for supplying hydraulic fluid to and from the cylinder 18 for causing operation of the cutter 32 as described above. Such power means includes an air/oil intensifier pump of the type manufactured by Interface Devices, Inc. and sold under the tradename "PIXIE".

Figure 5:
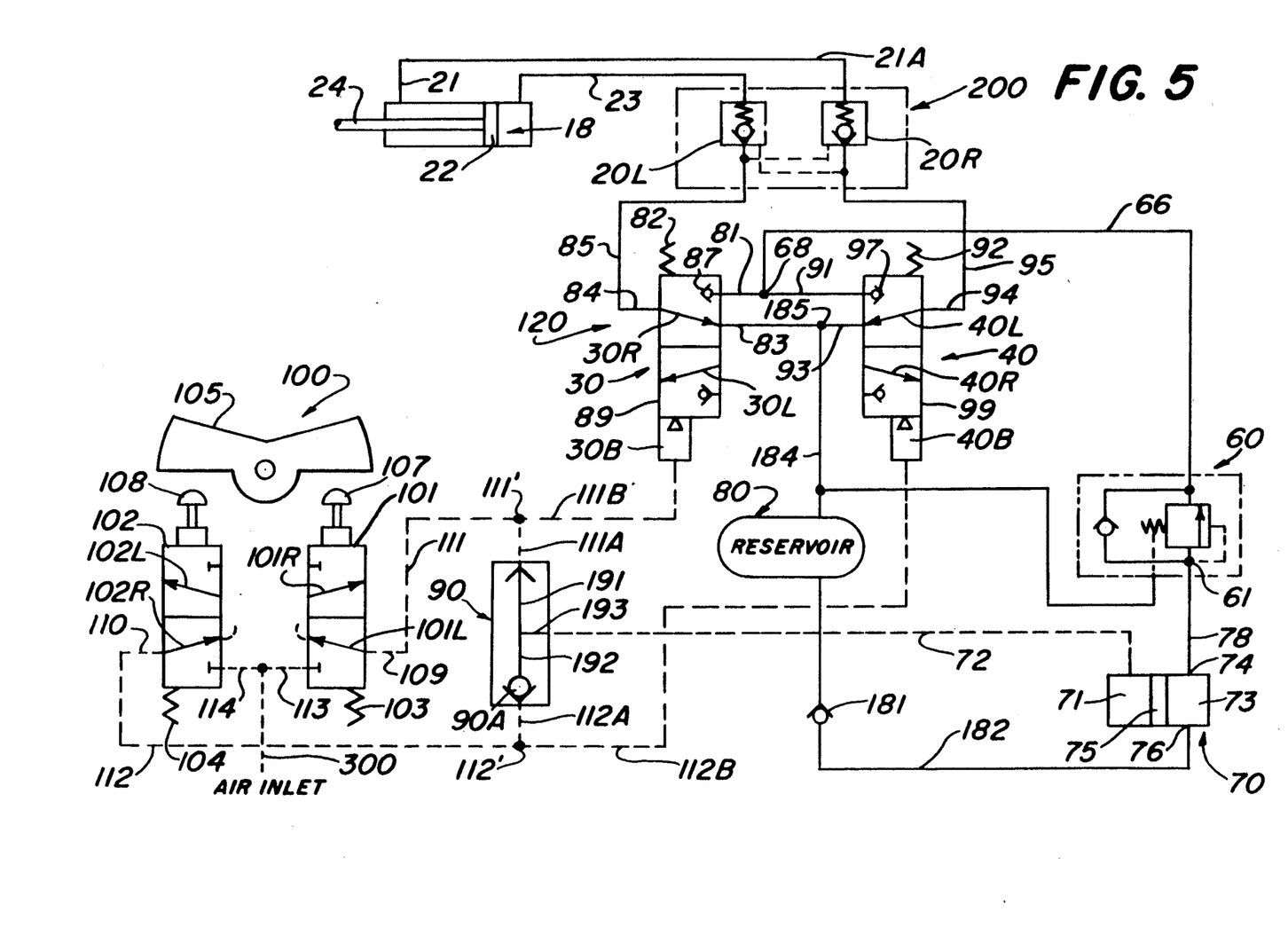
FIG. 5 is a schematic view of the hydraulic and pneumatic systems of the portable rescue tool shown in FIGS. 1 to 4.
Figure 6:
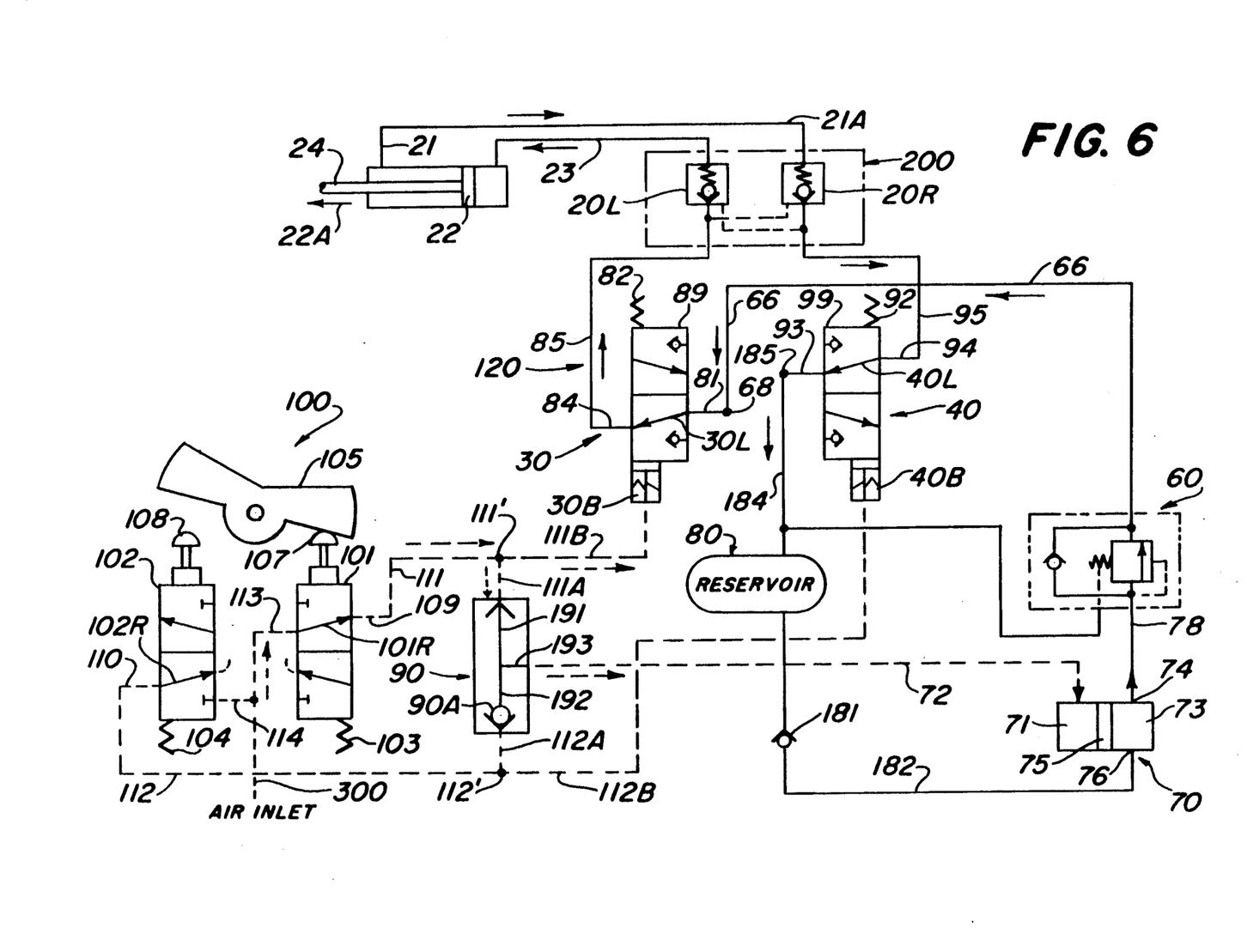
FIG. 6 is a schematic view similar to FIG. 5 with the systems shown in a first operating condition.
Figure 7:
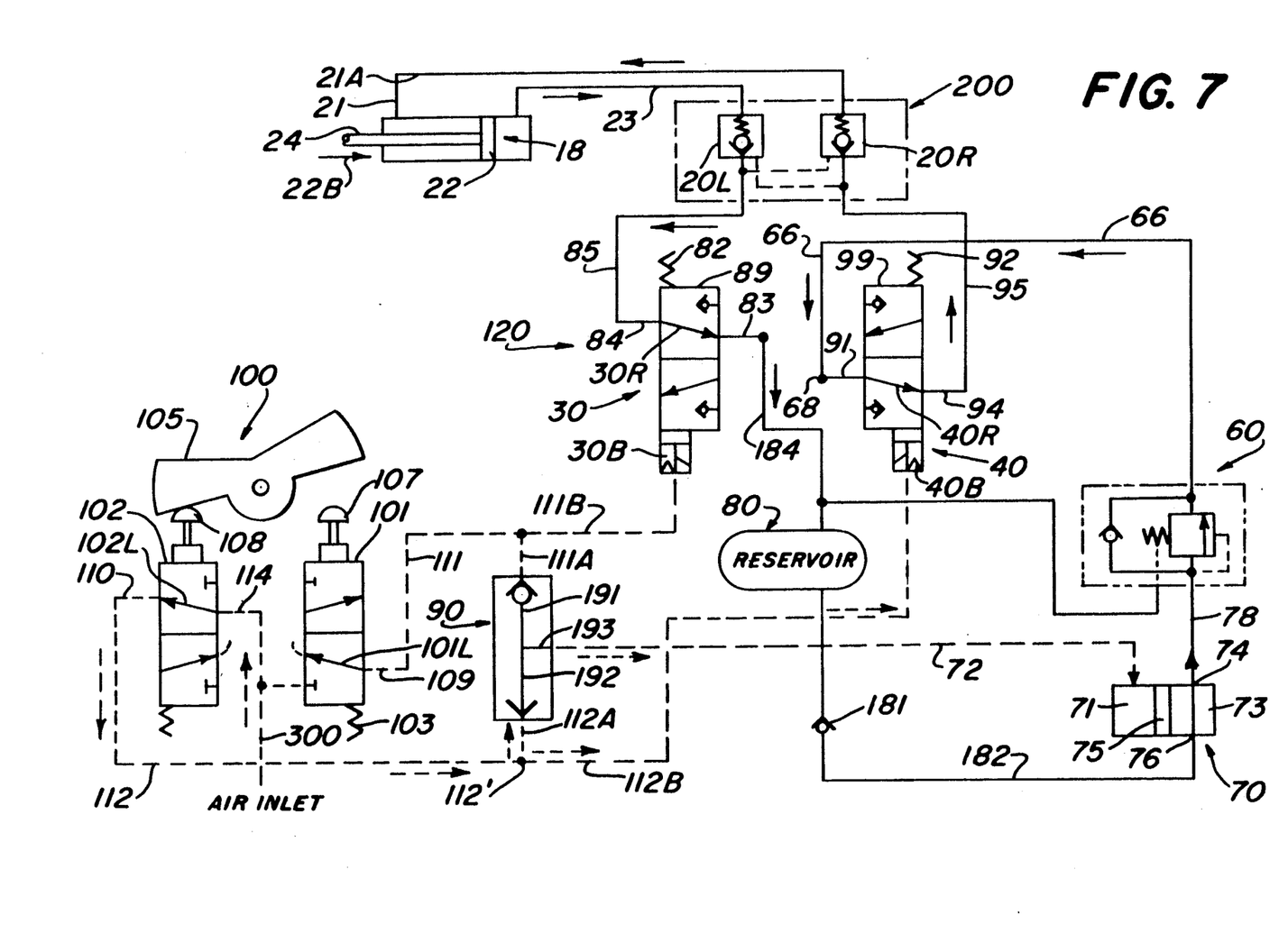
FIG. 7 is a schematic view similar to FIG. 5 with the systems shown in a second operating condition.

The pump of the power means is indicated generally at 70 in the schematic views FIGS. 5-7 and essentially comprises an air section 71 having an air inlet line 72 connected thereto and an oil section 73 having an oil discharge 74 through which the pumped oil is delivered from the pump 70. The pump 70 comprises a ratio plate 75 and is responsive to the supply of high pressure air to air section 71 by way 5 of inlet 72 to pump oil at a high pressure from oil section 73 through oil discharge 74. While various types of air to oil pumps may be employed, the "PIXIE" is particularly suited for use in the rescue tool of the invention because of its small size, which results from its manifold design. For example, in an actual embodiment of the invention, the pump 70 is cylindrical in shape and measures 4.75 inches in diameter by 8.0 inches long, weighing approximately 11 pounds. The "PIXIE" pump is also desirable because it employs a built-in reservoir and because of its integrated design. The "PIXIE" pump also has a built-in exhaust muffler. By way of example, a pump suitable for use with the rescue tool of the invention is designed for a maximum operating pressure of 5,000 PSI at an air supply of 90 PSIG and for delivering 1.4 GPM at an 800 PSI load.

While the air/oil intensifier pump 70 is of a type known in the art, its construction and operation will be briefly described. Thus, pump 70 is a reciprocating piston pump using air as the motive power. The pump is constructed to intensify the hydraulic oil by the air to oil piston area ratios. Air pressure operating on the large air piston produces a force which is transmitted by way of mechanical linkage to the smaller oil piston which pumps the hydraulic fluid at a higher pressure. The differential area of the piston allow low pressure air, such as 100 PSI, to generate a high hydraulic pressure, such as for example 5,000 PSI. The "PIXIE" pump utilizes a manifold design and the regulator, muffler and necessary valving are all integrated into the pump body and connected through internal passages.

The operation of the pump and the hydraulic circuits employed in the rescue tool of the invention will be described in detail hereafter with references to FIGS. 5 to 7. In FIGS. 5 to 7, the flow lines for the pneumatic system are shown in dashed lines, and the flow lines for the hydraulic system are shown in solid lines.

Referring initially to FIG. 5, the main elements of the power means comprises the pump 70 and an associated reservoir 80 of hydraulic fluid and a sequencing valve 60; a first or air flow control means including a manually operable, three-position, pneumatic directional control valve 100, a shuttle valve 90, and associated flow lines; and a second or hydraulic flow control means including an air-actuated three-way valve means 120 (which includes two valves 30 and 40), a dual pilot check valve 200 and associated flow lines.

The air flow control means is constructed and arranged for controlling the flow of air to inlet line 72, such air flow control means being contained in the rear portion of the tool body 12. Briefly, control valve 100 is movable between a first position, shown in FIG. 5, for blocking air flow to the air inlet line 72 of pump 70, a second position, shown in FIG. 6, for directing air flow to flow through a first discharge port 109, and a third position, shown in FIG. 7, for directing the air to flow through a second discharge port 110. Control valve 100 is provided with means for biasing the same to said first position as will be described more fully hereafter.

More specifically, control valve 100 comprises a right side valve 101 and a left side valve 102 biased to the flow blocking position shown in FIG. 5 by associated spring means 103 and 104, respectively. Valves 101 and 102 are manually movable to flow permitting positions by means of a trigger means comprising a pivoted lever 105 and associated actuating members 107 and 108. When lever 105 is pivoted in a clockwise direction to the position shown in FIG. 6, it causes the actuating member to move valve 101 to the flow permitting position shown in FIG. 6. When lever 105 is pivoted in a counterclockwise direction to the position shown in FIG. 7, it causes the actuating member to move valve 102 to the flow permitting position shown in FIG. 7.

An air supply inlet line 300 is arranged to receive high pressure air from a supply thereof (to be described hereafter) and direct it to the inlet ports 113 and 114 associated with valves 101 and 102, respectively. Valve 101 is cooperable with a first discharge port 109 which is connected to a flow line 111. Valve 102 is cooperable with a second discharge port 110 which is connected to a flow line 112. At its downstream end, flow line 111 is connected to a connection 111' where the flow branches in two directions, i.e., through line 111A to the shuttle valve 90 and through line 111B to the air operating chamber 30B of valve 30. At its downstream end, flow line 112 is connected to a connection 112' where the flow branches in two directions, i.e., through line 112A to the shuttle valve 90 and through line 112B to the air actuating chamber 40B of valve 40.

Shuttle valve 90 comprises a ball valve member 90A movable between two flow control positions as shown in FIGS. 6 and 7 by the introduction of air through lines 111A and 112A into valve 90 by way of inlet passages 191 and 192, respectively. Shuttle valve 90 has a single discharge port 193 which is connected to the upstream end of air inlet 72 which supplies air to the air section 71 of the pump 70 for causing operation thereof as described above.

The power means for the tool also includes a second control means for controlling the flow of oil from the oil discharge 74 of the air/oil intensifier pump 70 to the conduit means of the hydraulic actuator unit, namely, the flow lines 21, 21A, and 23 for operating the piston 22 in the manner described above. The second control means includes an oil supply conduit means, as shown by the flow lines in FIG. 5, for delivering oil from oil discharge 74 to said conduit means of the hydraulic actuator unit, and the valve means 120 and the check valve 200, said valves 120 and 200 being arranged for controlling flow through said oil supply conduit means.

Hydraulic fluid is supplied to pump 70 from reservoir 80 constructed and arranged to supply hydraulic fluid through supply line 181, containing a check valve 182, to an inlet 76 for oil section 73 of pump 70. Reservoir 80 is a bladder-type reservoir having a closed sealed chamber with a diaphragm contained therein and, typically, will have a capacity of ten cubic inches.

The discharge 74 of pump 70 is connected through a flow line 78 to the inlet 61 of the sequencing valve 60. The sequencing valve 60 is a well known device and is also known in the art as an unloading valve. As used in the hydraulic circuit shown in the drawings, sequencing valve 60 is part of the pump circuit, pump 70 being what is known in the art as a "high-low" pump which generates high flow at low pressures up to 1500 PSI. Above 1500 PSI, the pump 70 generates low flows. The sequencing valve 60 is constructed and arranged to unload a given volume of fluid at a preset pressure, such as 1500 PSI.

The high pressure oil is delivered from sequencing valve 60 through a flow line 66 to valve means 120 at a connection 68 whereat the flow is directed to valves 30 and 40 by way of a pair of inlets 81 and 91, respectively, therefor. Valves 30 and 40 comprise valve members 89 and 99 which are biased to the normal flow blocking positions shown in FIG. 5 by associated springs 82 and 92, respectively. Valves 30 and 40 are constructed and arranged to be air-actuated to the flow permitting positions shown in FIGS. 6 and 7, respectively. When air is supplied to the air actuating chamber 40B from line 112B in response to operation of the air control valve 100, valve member 99 of valve 40 is actuated, against the bias of spring 92, to the flow permitting position shown in FIG. 6. When air is supplied to air actuating chamber 30B from line 111B in response to operation of the air control valve 100, valve member 89 of valve 30 is actuated, against the bias of spring 82, to the flow permitting position shown in FIG. 7 to provide a flow condition as will be described more fully hereafter. When the system is in the condition shown in FIG. 5, the inlets 81 and 91 communicate with closed check valves 97 and 87 in the upper sections of valves 40 and 30, respectively. At the same time, the flow passages 40L and 30R in the upper section of valves 40 and 30 communicate with the discharges 93 and 83 for valves 40 and 30, respectively, as shown in FIG. 5, said discharges being in communication at connection 185 with a flow line 184 leading to the inlet side of the reservoir 80 as shown in FIG. 5. Valve 30 is cooperable with a flow port 84 which communicates with one end of a flow line 85 that extends therefrom to the check valve 200. Valve 40 is cooperable with a flow port 94 which communicates with one end of a flow line 95 that communicates at its other end with the check valve 200. In the FIG. 5 position, flow ports 94 and 84 communicate with flow passages 40L and 30R of valves 40 and 30, respectively. Valves 40 and 30 also have flow passages 40R and 30L, respectively, in lower sections thereof for a purpose to be described hereafter.

The dual pilot check valve 200 is a device commonly employed in rescue tools and, briefly stated, functions to prevent the hydraulic cylinder 18 from dropping a load. In other words, check valve 200 insures that the piston 22 in cylinder 18 will not move in any direction unless the operator of the tool operates the control means to cause a desired movement thereof. This is achieved by an arrangement wherein two check valves 20L and 20R are interconnected by a piloted control means in a manner well known in the art. The valve 200 is "piloted" in that it is sent a signal to open when a reverse flow thereof is required. In the system shown in the drawings, the dual (two check valves) piloted check valve 200 is used to prevent the piston from moving in the event of a loss of pressure to the cylinder 18. This is a safety feature common to rescue tools which prevents the tool arms from moving in an unwanted direction during the use of the tool.

The various elements of the power means are contained in rear body portion 12 which comprises sections 12A–E. Section 12A comprises an air cap and section 12B comprises an air cylinder whereat the air section 71 of pump 70 is located. Section 12C contains the ratio plate for pump 70. Section 12D contains the oil section of pump 70 and the associated valves 60 and 120. Section 12E contains the sealed reservoir 80.

In the operation of the cutting tool, the operator can open or close the cutting blades 38 by a simple manipulation of lever 105 of the directional control valve 100. Lever 105 is located at the rear end of the cutting tool where it is easily accessable to the operator who can move it in either of two directions from the rest position (FIG. 5) based on whether it is desired to open or close the cutting blades 38.

The normal position of valve 100 is shown in FIG. 5 wherein the control system maintains the cutting tool and its cutting blades 38 in a rest position. In the position shown in FIG. 5, springs 103 and 104 maintain valves 101 and 102 in the positions shown, whereby the air supply through line 300 and branch lines 113 and 114 is blocked. Accordingly, there is no supply of high pressure air to the inlet line 72 of pump 70 whereby pump 70 is inoperative. There is also no air supply to actuating chambers 30B and 40B of valves 30 and 40 whereby springs 82 and 92 maintain said valves in their flow blocking positions shown in FIG. 5. Thus, there is no high pressure oil supplied to cylinder 18 and piston 22 is maintained at rest.

When it is desired to move cutting blades 38 from an open position to close the blades for cutting, lever 105 is moved to the position as shown in FIG. 6. This movement positions valve member 101 in a position whereby line 113 communicates with a flow passage 101R in the upper section of valve member 101 to provide flow communication between lines 113 and 109. Accordingly, high pressure air is introduced into line 111 and flows to connection 111' and lines 111A and 111B. The air flowing through 111A enters inlet passage 191 of shuttle valve 90 to move ball 90A to the position adjacent line 112A whereby the air flows through passage 191 and discharge port 193 to the upstream end of inlet line 72. The high pressure air flows through inlet line 72 to the air section 71 of pump 70 to effect operation thereof to pump high pressure oil (or hydraulic fluid) through discharge 74, oil being supplied to pump 70 from reservoir 80 in the manner described above. The oil flows through sequencing valve 60 and line 66 to be introduced into the hydraulic control valve 120 at connection 68.

The high pressure air flowing through line 111B is introduced into actuating chamber 30B of valve 30 to actuate the same to the position shown in FIG. 6 whereby inlet 81 is in communication with flow line 30L in the lower section of valve member 89 to provide flow communication between inlet 81 and port 84. Accordingly, high pressure oil is introduced into line 85 and flows to dual pilot check valve 200 to actuate the check valves 20L and 20R such that high pressure oil flows through check valve 20L and through line 23 to cylinder 18 on the rear side of piston 22 thereby forcing piston 22 forwardly. This forward movement of piston 22 drives piston rod 24 forwardly, as shown by arrow 22A in FIG. 6, to move the cutting blades 38 in a closing direction to perform a cutting operation. When piston 22 is driven forwardly, the low pressure hydraulic fluid between the piston 22 and forward end of cylinder 18 is removed from cylinder 18 by way of lines 21 and 21A and delivered to check valve 200 which now permits flow through the check valve 20R so that the oil flows through line 95 to the port 94 of valve 40. Since valve member 99 of valve 40 is in its normal or nonactuated position, flow passage 40L provides flow communication between port 94 and discharge 93 whereby the oil is delivered to line 184 and returned to the reservoir 80.

When it is desired to open the cutting blades 38 after cutting has been completed, lever 105 is moved to the position shown in FIG. 7. This movement positions valve member 102 in a position whereby line 114 is in communication with a flow passage 102L in the upper section of valve member 102 to provide flow communication between lines 114 and 110. Accordingly, high pressure air is introduced into line 112 and flows to connection 112' and lines 112A and 112B The air flowing through line 112A is introduced into inlet passage 192 of shuttle valve 90 to move ball 90A to the upper position adjacent line 111A whereby air flows through passage 192 and discharge port 193 to the upstream end of inlet line 72 of pump 70. The high pressure air flow through inlet line 72 enters the air section 71 of pump 70 to effect operation of the pump 70 to pump high pressure oil through the pump discharge 74, oil being supplied to the pump from reservoir 80 and line 182 as described above. Accordingly, the oil flows through sequencing valve 60 and lines 66 to the connection 68 for the hydraulic control valve 120.

The high pressure air flowing through line 112B is introduced into the actuating chamber 40B of valve 40 to actuate the same to the position shown in FIG. 7 whereby inlet line 91 is in communication with a flow passage 40R in the lower section of valve member 99 to provide flow communication between inlet line 91 and port 94. Accordingly, high pressure oil is introduced into line 95 and flows to the dual pilot check valve 200 to actuate the check valves 20L and 20R such that high pressure oil flows through check valve 20R and through lines 21A and 21 to cylinder 18 on the forward side of piston 22 thereby forcing piston 22 rearwardly. This rearward movement of piston 22 moves the piston rod 24 rearwardly to thereby actuate the cutting blades 38 through an opening movement. The direction of movement of the piston 22 and piston rod 24 is shown by the arrow 22B in FIG. 7. When the pressurized fluid is introduced into cylinder 18 on the forward side of the piston 22, piston 22 moves toward the rearward end of cylinder 18 whereby the low pressure hydraulic fluid between the piston 22 and the rear end of cylinder 18 is forced into and through flow passage 23 to the dual pilot check valve 200 whereat it flows through the check valve 20L (which has been opened by the pilot flow resulting from the introduction of oil through line 95) and the oil then flows from valve 200 through line 85 to port 84 in communication with valve member 89 which is in its normal position. The oil then flows through a flow passage 30R in the upper section of valve member 89 to discharge 83 from which the oil flows through line 184 back to the reservoir 80 for recycling and repressurization.

In FIGS. 6 and 7, the flow of the air and the hydraulic fluid are indicated by dashed arrowed lines and solid arrowed lines, respectively, to provide a visual illustration of the operation of the pneumatic end hydraulic system used with the rescue tool in accordance with the invention.

From the foregoing, it will be seen that the rescue tool in accordance with the invention is constructed to be portable by reason of the integrated body 10 which contains the hydraulic actuator unit and the power means therefor, and the tool means 32 mounted on the forward end of body 10. The portability of the rescue tool is further enhanced by provision of a portable supply of high pressure air in the form of a lightweight cylinder 301 containing a supply of high pressure air. Further, the cylinder 301 has associated therewith a harness and back plate assembly 303 which provides means for attaching the cylinder 301 to the upper body of a person carrying the same. A high pressure hose 305 and coupling means 307 is also provided to deliver, by way of a single hose line, the supply of high pressure air which flows from a coupling 307 at the lower end of the cylinder 301 through air hose line 305 to a coupling means 309 (FIG. 3) for coupling to the air inlet 300 which is associated with the control valve 100 as described above. One suitable air supply as described above is available from Scott Aviation which distributes the Scott Air-Pak IIa which includes a suitable cylinder, air hose and coupling, and associated harness and back plate assembly, for use with the invention as described above.

Figure 1:
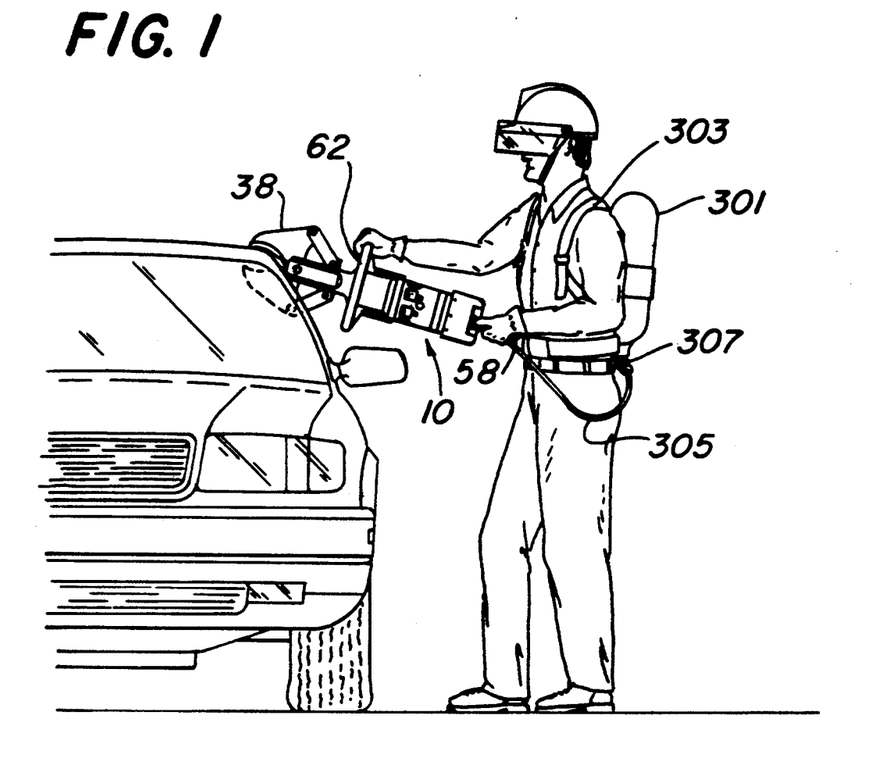
FIG. 1 is a view illustrating the use of a portable rescue tool in accordance with the invention.

As is shown in FIG. 1, the air supply means described above allows the portable rescue tool in accordance with the invention to be carried by one person with complete freedom of movement. FIG. 1 shows the use of the rescue tool at an accident situation for performing a cutting operation on an automobile. In addition to being portable, the rescue tool in accordance with the invention is easily positioned and manipulated and is light enough in weight and compact enough in size to be easily handled by one person as is apparent from a consideration of FIG. 1. To aid in the manipulation and stability of the rescue tool during use, there are provided a rear handle 58 and a U-shaped forward handle 62 as is conventional in rescue tools of this type. The rear handle 58 is secured on the rear end of a shroud 58A mounted on the rear end of the body portion 12 as shown in FIG. 1 and 2. Rear handle 58 is a straight cylindrical member and extends generally parallel to the longitudinal axis of the tool rearwardly from the shroud 58A. The U-shaped handle 62 is secured at a forward portion of the body portion 11 by means of a bracket 62A as is best shown in FIGS. 2 and 3. As is conventional, the handles 58 and 62 are constructed and arranged to allow the tool to be operated from either side by either a single right or left handed operator.

As is best shown in. FIGS. 2 and 3, the lever 105 for the air control valve 100 is located adjacent the rear handle 58 so that the user can operate the tool without taking his hands off the handles 58 and 62.

It will be apparent that various changes may be made in the construction and arrangement of parts without departing from the scope of the invention as defined by the appended claims. For example, the hydraulic actuator unit mounted on the tool body and driven by the power means of the invention can be adapted to actuate various types of tool mechanisms in addition to cutter blades, such as for example, spreading tools, rams and the like. Also, various types of cutting blades may be employed in a cutting tool in accordance with the invention, such as for example, the Paladin type of blades known in the art. Furthermore, the air/oil pump may take various forms and may operate with other types of gases, such as for example, an inert gas such as nitrogen, and/or fluids, such as for example, water. Furthermore, while the tool is shown as being operated from a source of compressed air in a form of an air bottle carried on the back of a fireman as part of the tool, it will be apparent that the tool can be used with other types of compressed air supplies. Also, there will be provided a suitable pressure relief means for preventing the pump from generating more hydraulic pressure than the designed operating pressure of the hydraulic tool, such as a pneumatic relief valve, which, preferably, will be located prior to air inlet 300 and will vent to atmosphere.

What is claimed is:

1. A portable rescue tool adapted for use with a supply of high pressure air comprising,
   an elongated tool body having a rescue tool mechanism mounted at one end thereof;
   a hydraulic actuator unit mounted on said tool body and operatively connected to said rescue tool mechanism for actuating the same through a rescue operation, said hydraulic actuator unit including a conduit means for delivering high pressure hydraulic fluid thereto for causing operation thereof; and power means mounted on said tool body for pumping hydraulic fluid at a high pressure through said conduit means for causing operation of said hydraulic actuator unit, said power means including a air/oil intensifier pump including an air section having an air inlet line and an oil section having an oil discharge, and being constructed and arranged to be responsive to the delivery of high pressure air to said air section by way of said air inlet to pump oil at a high pressure from said oil section through said oil discharge, first control means for controlling a flow of air to said air inlet line including an air supply inlet for receiving high pressure air from the supply thereof, an air supply conduit means for delivering air from said air supply inlet to said inlet line of said air/oil intensifier pump, and first valve means for controlling the flow of air through said air supply conduit means, and second control means for controlling the flow of oil from said oil discharge of said air/oil intensifier pump to said conduit means of said hydraulic actuator unit including an oil supply conduit means for delivering oil from said oil discharge of said air/oil intensifier pump to said conduit means of said hydraulic actuator unit, and second valve means for controlling the flow of oil through said oil supply conduit means, whereby the portable rescue tool is a self-contained unit including a hydraulic actuator unit for the rescue tool mechanism and integrated power means for operating said hydraulic actuator unit.

2. A portable rescue tool according to claim 1 including a portable container for the supply of high pressure air, means for attaching said container to the upper body of a person for carrying the same, and a hose extending from said container to the air supply inlet of said first control means, whereby said portable rescue tool can be carried by said person with complete freedom of movement.

3. A portable rescue tool according to claim 1 wherein said intensifier pump includes a bladder-type reservoir of hydraulic fluid, said reservoir having an enclosed sealed chamber and a diaphragm contained within said chamber.

4. A portable rescue tool according to claim 1 wherein said hydraulic actuator unit comprises a hydraulic cylinder means including a piston reciprocable within a cylinder, and means for connecting said piston to said rescue tool mechanism for actuating the same, said conduit means of said hydraulic actuator unit having a first flow line arranged to communicate with said cylinder on one side of said piston and a second flow line arranged to communicate with said cylinder on the other side of said piston.

5. A portable rescue tool according to claim 3 wherein said first valve means comprises a manually operable three-position valve having a first position for blocking air flow to said air inlet line of said air/oil intensifier pump, a second position for directing air to flow through a first discharge port, and a third position for directing air to flow through a second discharge port, and including means for biasing said first valve means to said first position.

6. A portable rescue tool according to claim 5 wherein said second valve means for controlling the flow of oil through said oil supply conduit means is constructed and arranged to be air operated and comprises a first and a second air inlet, and including a first air conduit means for delivering air from said first discharge port of said first valve means to said first air inlet of said second valve means and a second air conduit means for delivering air from said second discharge port of said first valve means to said second air inlet of said second valve means, said second valve means being operable to a first control position in response to air being supplied to said first air inlet thereof and to a second control position in response to air being supplied to said second inlet thereof.

7. A portable rescue tool according to claim 6 wherein when said second valve means is in said first control position, oil is delivered to said first flow line of said conduit means of said hydraulic actuator unit, and when said second valve means is in said second control position, oil is delivered to said second flow line of said conduit means of said hydraulic actuator unit.

8. A portable rescue tool according to claim 7 wherein said second control means for controlling the flow of oil to said conduit means of said hydraulic actuator unit includes a dual pilot-operated check valve for controlling flow through each of said first and second flow lines of said conduit means of said hydraulic actuator unit.

9. A portable rescue tool adapted for use with a supply of high pressure fluid comprising, an elongated tool body having a rescue tool mechanism mounted at one end thereof;

a hydraulic actuator unit mounted on said tool body and operatively connected to said rescue tool mechanism for actuating the same through a rescue operation, said hydraulic actuator unit including a conduit means for delivering high pressure hydraulic fluid thereto for causing operation thereof; and power means mounted on said tool body for pumping hydraulic fluid at a high pressure through said conduit means for causing operation of said hydraulic actuator unit, said power means including an intensifier pump including an air section having an inlet line and a fluid section having a fluid discharge, and being constructed and arranged to be responsive to the delivery of pressurized fluid to said inlet section by way of said inlet line to pump fluid at a high pressure from said fluid section through said fluid discharge, first control means for controlling a flow of fluid to said pump inlet line including a fluid supply inlet for receiving pressurized fluid from the supply thereof, and second control means for controlling the flow of fluid from said fluid discharge of said intensifier pump to said conduit means of said hydraulic actuator unit including a fluid conduit means for delivering fluid from said fluid discharge of said intensifier pump to said conduit means of said hydraulic actuator unit, and second valve means for controlling the flow of fluid through said fluid supply conduit means, whereby the portable rescue tool is a self-contained unit including a hydraulic actuator unit for the rescue tool mechanism and integrated power means for operating said hydraulic actuator unit.

10. A portable rescue tool adapted for use with a supply of high pressure gas comprising, an elongated tool body having a rescue tool mechanism mounted at one end thereof, a hydraulic actuator unit mounted on said tool body and operatively connected to said rescue tool mechanism for actuating the same through a rescue operation, said hydraulic actuator including a conduit means for delivering high pressure hydraulic fluid thereto for causing operation thereof; and power means mounted on said tool body for pumping hydraulic fluid at a high pressure through said conduit means for causing operation of said hydraulic actuator unit, said power means including a gas/fluid intensifier pump including a compressed gas section having a gas inlet line and a fluid section having a fluid discharge, and being constructed and arranged to be responsive to the delivery of high pressure gas to said gas section by way of said gas inlet line to pump fluid at a high pressure from said fluid section through said fluid discharge, first control means for controlling a flow of gas from the supply thereof, a gas supply conduit means for delivering gas from said gas supply inlet to said gas inlet line of said intensifier pump, and first valve means for controlling the flow of gas through said gas supply conduit means, and second control means for controlling the flow of fluid from said fluid discharge of said intensifier pump to said conduit means of said hydraulic actuator unit including a fluid conduit means for delivering fluid from said fluid discharge of said intensifier pump to said conduit means of said hydraulic actuator unit, and second valve means for controlling the flow of fluid through said fluid conduit means, whereby the portable rescue tool is a self-contained unit including a hydraulic actuator unit or the rescue tool mechanism and integrated power means for operating said hydraulic actuator unit.

11. A portable rescue tool according to claim 10 including a portable container for the supply of high pressure gas, means for attaching said container to the upper body of a person for carrying the same, and a hose extending from said container to the gas supply inlet of said first control means, whereby said portable rescue tool can be carried by said person with complete freedom of movement.

* * * * *